United States Patent Office 3,719,659
Patented Mar. 6, 1973

3,719,659
INTERMEDIATES FOR MAKING LINCOMYCINS AND PROCESS FOR PREPARING THE SAME
Barney J. Magerlein, Kalamazoo, Mich., assignor to The Upjohn Company, Kalamazoo, Mich.
No Drawing. Filed Feb. 10, 1970, Ser. No. 10,290
Int. Cl. C07c 47/18
U.S. Cl. 260—210 R     8 Claims

ABSTRACT OF THE DISCLOSURE

Lower-alkyl 1 - thio-α-D-galacto-hexodialdo-1,5-pyranosides useful as intermediates in the preparation of lincomycins are prepared by periodate oxidation of lower-alkyl 1-thio-α-D-galacto-hepto- and octopyranosides containing a hydroxyl group in the 7-position and a hydroxyl or amino group in the 6-position.

BRIEF DESCRIPTION OF THE INVENTION

This invention relates to novel compounds, 1-thio-α-D-galacto-hexadialdo-1,5-pyranosides, and to a process for their preparation.

The novel compounds of the invention have the formula

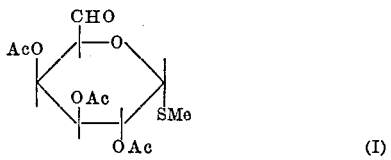
(I)

where Me is methyl or other lower-alkyl and Ac is hydrogen or a protective carboxacyl group removable by acid or base catalyzed hydrolysis. Protective carboxacyls are a well-known group of acyls used in sugar chemistry to cover hydroxy groups of sugars. Ordinarily acetyl or benzoyl is used but any equivalent carboxacyl group can be used, for example lower-alkanoyl and aroyl can be used.

The compounds of the invention are prepared by periodate oxidation of a compound of the formula

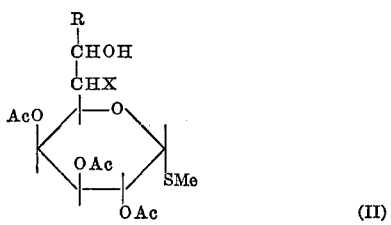
(II)

where R is hydrogen or methyl, X is OH or $NH_2$, and Ac and Me are as given above.

The starting compounds II are either known or can be prepared easily from known compounds. Suitable starting compounds are methyl and ethyl α-thiolincosaminide (methyl and ethyl 6-amino-6,8-dideoxy-1-thio-D-erythro-α-D-galacto-octopyranoside), and the 8-nor analogs thereof. Another suitable starting compound is methyl or ethyl 1-thio-D-glycero-α-D-galactoheptopyranoside which can be prepared by treating D-glycero-D-galactoheptose in hydrochloric acid with methanethiol or ethanethiol. Still another suitable starting compound is methyl or ethyl 6,7,8-trideoxy-2,3,4-tri-O-acyl-1-thio-D and L-threo and D and L-erythro-α-D-galacto-oct-6-enopyranoside which is obtained as follows:

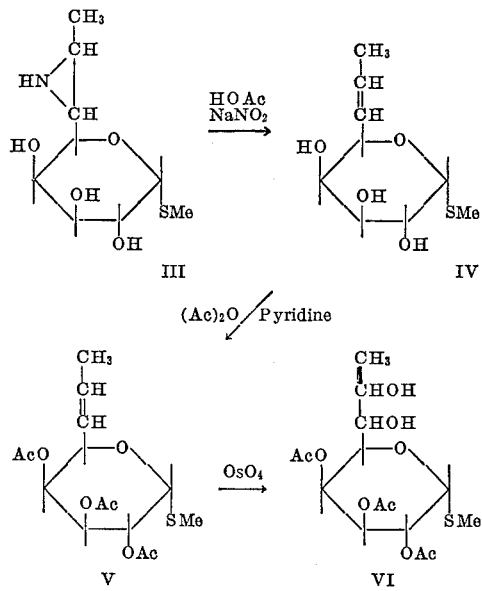

Compound III, methyl or ethyl 6,7-aziridino-6,7,8-trideoxy - 1 - thio-D-erythro - α - D-galacto-octopyranoside (methyl or ethyl 6-deamino-7-deoxy-6,7-aziridino-1-thio-α-lincosaminide) is disclosed in Belgian Patent 732,352 which is the Belgian cognate of U.S. application Ser. No. 725,531 filed Apr. 30, 1968.

Compound III is reacted with acetic acid and sodium nitrite in the cold to form compound IV. Compound IV is acylated by the usual acylation procedure and the resulting peracylate is oxidized with osmium tetroxide in a manner already well known in the art.

The novel compounds of Formula I are useful as intermediates. Sodium borohydride reduction, in a manner already well known in the art, converts them to the corresponding 1-thio-α-D-galactohexopyranosides of the formula

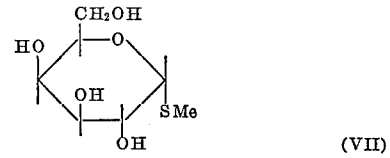
(VII)

where Me as ethyl is known in the art. Fried et al. J. Amer. Chem. Soc. 71 140 (1949).

Also compounds of Formula VII where Me is methyl or ethyl can be converted respectively to lincomycin and lincomycin C (S-demethyl-S-ethyllincomycin) by the procedure given in U.S. application Ser. No. 867,362 filed Oct. 17, 1969.

The compound of Formula VII and those of Formula I where Ac is hydrogen are also useful to modify polyurethan resins. Either as such or after condensation with ethylene or propylene oxide they can be added to the reaction mixture of polyol and polyisocyanate and function therein as a crosslinking agent or as all or part of the polyol component.

DETAILED DESCRIPTION OF THE INVENTION

The periodate oxidation step is carried out in a manner already well known in the art. The reaction, however, is atypical in that simultaneous oxidation of the sulfur or splitting of the ring at the vicinal ring hydroxyls do not take place.

In general the reaction is carried out either in water or in a water-miscible solvent plus water depending upon the solubility of the starting compound II. Thus, when Ac is hydrogen the reaction can be effected satisfactorily in water. When, however, Ac is acetyl or other protective carboxacyl a water-miscible solvent such as methanol, dioxane, or dimethylformamide can be used.

The reaction is effected at room temperature or below. Initially it is desirable to cool the reaction, for example in an ice-bath to about 5° C. or lower in order to dissipate the exotherm. Temperatures between about 0° C. and about 25° C. will ordinarily be used.

The proportion can be varied but an excess of periodate greater than 5% of the stoichiometric is undesirable. The concentration, based on the periodate, is advisably between about 0.5 and 0.1 molar.

Instead of sodium metaperiodate $NaIO_4$, there can be used other alkali metal metaperiodates, for example potassium metaperiodate. Also periodic acid, both the meta- and the para-periodic acids, can be used. At low pH some hydrolysis of acyl group can be expected but this is not ordinarily objectionable. If this is not desired the pH should be kept between pH 5 and about pH 8. After separation of iodate or any unreacted periodate, the product can be subjected to acid hydrolysis to remove the acyl group. The acyl groups can also be removed by base catalyzed hydrolysis. The latter occurs in borohydride reduction to compounds VII.

The invention can be more fully understood by reference to the following examples in which the solvent ratios are by volume and the parts are by weight if not otherwise specified.

Example 1.—Methyl 1-thio-α-D-galacto-hexodialdo-1,5-pyranoside

Part A–1: Methyl 6-deamino-7-deoxy-Δ⁶-thiolincosaminide (IV).—A solution of 116.4 g. of methyl 6-deamino-7-deoxy-6,7-aziridino-1-thio-α-lincosaminide (III) in 550 ml. of acetic acid and 400 ml. of water was prepared. While cooling in an ice bath, a solution of 47 g. of sodium nitrite in 90 ml. of water was added over about 1 min. Crystals formed within a few minutes and were collected, washed sparingly with cold water and dried. The yield of methyl 6-deamino-7-deoxy-Δ⁶-α-thiolincosaminide (IV), M.P. 181–183° C., sinter 176° C., was 85.7 g. (79.4%).

Part B–1: The procedure of Part A–1 was repeated and the product was recrystallized from acetone to afford an analytical sample, M.P. 184–188° C., [α]$_D$ +335° (MeOH).

Analysis.—Calc'd for $C_9H_{16}O_4S$ (percent): C, 49.07; H, 7.32; S, 14.56. Found (percent): C, 48.79; H, 7.30; S, 14.34.

Part C–1: Methyl 6-deamino-7-deoxy-Δ⁶-α-thiolincosaminide 2,3,4-triacetate (V).—Acylation of 102 g. of methyl 6-deamino-7-deoxy-Δ⁶-α-thiolincosaminide (IV) with 515 ml. of pyridine and 266 ml. of acetic anhydride gave after crystallization from methanol 147 g. of methyl 6-deamino-7-deoxy-Δ⁶-α-thiolincosaminide 2,3,4-triacetate (V) (91.8%), M.P. 136–140°, [α]$_D^{25}$ 217° (MeOH).

Analysis.—Calc'd for $C_{15}H_{24}O_9S$ (percent): C, 52.01; H, 6.40; S, 9.26. Found (percent): C, 52.19; H, 6.58; S, 9.26.

Part D–1: Methyl 6-deamino-6-hydroxy-α-thiolincosaminide 2,3,4-tri-O-acetate (VI).—Osmium tetroxide (100 g.) was added to a solution of 136 g. of methyl 6-deamino-7-deoxy-Δ⁶-α-thiolincosaminide 2,3,4-triacetate (V) in 2.3 l. of benzene. After standing at ambient temperature for 4 days the black solution was saturated with $H_2S$ while cooling and centrifuged. The precipitate was successively washed thoroughly with benzene and methylene chloride. Evaporation of the solvent gave a residue of 132 g. (89.3%) of oily methyl 6-deamino-6-hydroxy-α-thiolincosaminide 2,3,4-triacetate (VI).

The above procedure was repeated and a 4 g. portion of the diol (VI) was chromatographed over 250 g. of silica gel using chloroform-methanol (10:1) as the solvent system. After a forerun of 350 ml., 25 ml. fractions were collected. Fractions 2 through 9 were pooled and dried under vacuum to give 2.17 g. of a glass.

Analysis.—Calc'd for $C_{15}H_{24}O_9S$ (percent): C, 47.36; H, 6.36; S, 8.43. Found (percent): C, 46.62; H, 6.47; S, 8.37.

Part E–1: Methyl 1-thio-α-D-galacto-hexodialdo-1,5-pyranoside 2,3,4-tri-O-acetate (I).—To a solution of 15 g. of methyl 6-deamino-6-hydroxy-α-thiolincosaminide 2,3,4-tri-O-acetate (VI) in 450 ml. of methanol was added over 15 min. a solution of 833 ml. of 0.5 $NaIO_4$. The temperature was maintained at 5° C. by cooling in an ice bath. After 1.5 hrs. the solution was filtered and the filtrate concentrated in vacuo. Extraction of the residue with methylene chloride afforded after drying and evaporation 12 g. (91%) of methyl 1-thio-α-D-galacto-hexodialdo-1,5-pyranoside 2,3,4-tri-O-acetate (I), which resisted crystallization. A 1 g. portion was chromatographed over 100 g. of silica gel using MeOH-CHCl$_3$ (10:1) as the solvent system. After a forerun of 100 ml., 10 ml. fractions were collected. Fractions 5 through 7 were pooled and evaporated to dryness to yield methyl 1-thio-α-D-galacto-hexodialdo-1,5-pyranoside 2,3,4-tri-O-acetate (I).

Analysis.—Calc'd for $C_{13}H_{18}O_8S$ (percent): M⁺, 334. Found (percent): M⁺, 334.

A 274 mg. of the above chromatographic fraction when treated with Brady's Reagent gave 180 mg. of partially crystalline 2,4-dinitrophenylhydrazone. Recrystallization from ethanol raised the M.P. to 151–155° C.

Analysis.—Calc'd for $C_{19}H_{22}N_4SO_{11}$ (percent): C, 44.35; H, 4.31; N, 10.89. Found (percent): C, 44.45; H, 4.16; N, 10.85.

Example 2.—Conversion of methyl 1-thio-α-D-galacto-hexadialdo-1,5-pyranoside 2,3,4-triacetate to lincomycin Part A–2: Methyl 1-thio-α-D-galactopyranoside (VII).—Sodium borohydride (2.0 g.) was added to a solution of 12.0 g. of methyl 1-thio-α-D-galacto-hexoidaldo-1,5-pyranoside 2,3,4-triacetate in 170 ml. of methanol. After stirring at ambient temperature for 17 hrs. the reaction mixture was acidified and passed over a column of 75 g. of ion exchange resin MB–3. MB–3 is a monobed ion exchange resin containing the cation exchanger, Amberlite IR–120, $RSO_3$—H, and the anion exchanger Amberlite IR–410, $RN(CH_3)_2CH_2OH^+OH$ where R is a crosslinked nuclear polystyryl radical. Ten 50 ml. fractions were collected after discarding one column hold-up volume as forerun. Fractions 2 through 6 were combined and lyophilized and dried at 40° C. under vacuum to yield 6.6 g. (87.5%) of methyl 1-thio-α-D-galactoside as a glass.

The above procedure was repeated but the product crystallized on standing. This product was dissolved at the B.P. in acetone containing a minimum volume of methanol. Crystals, (VII) M.P. 104–111° C., were isolated, [α]$_D$ +296° ($H_2O$). Recrystallization did not change the melting point.

Analysis.—Calc'd. for $C_7H_{14}O_5S$ (percent): C, 39.99; H, 6.71; S, 15.25. Found (percent): C, 39.97; H, 7.24; S, 14.32.

Part B–2: Methyl 6-O-(p-tolylsulfonyl)-1-thio-α-D-galactopyranoside (VIII)

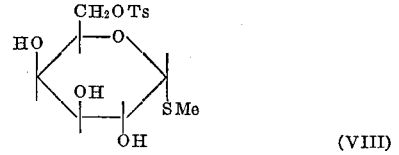

At 0° C. 5.65 g. of tosyl chloride was added to a solution of 6.0 g. of methyl 1-thio-α-D-galactopyranoside (VII) in 30 ml. of pyridine. The solution was maintained at 0° C. overnight and evaporated under vacuum. The residue was stirred with dilute HCl. The crystals of crude methyl 6 - O - (p - tolylsulfonyl) - 1-thio-a-D-galactoside (VIII) were collected by filtration and dried to give 5.54 g. M.P. 132–142° C. A portion was recrystallized from methanol. The melting point of methyl 6-O-(p-tolylsulfonyl)-1-thio-α-D-galactoside (VIII) proved to be highly dependent on the rate of heating. When heated at the rate of 2° C./mm., methyl 6-O-(p-tolylsulfonyl)-1-thio-α-D-galactoside (VIII) melted at 139–140° C., sinter 136° C. Its $[\alpha]_D^{25}$ in pyridine was +183°.

*Analysis.*—Calc'd. for $C_{14}H_{20}O_7S$ (percent): C, 46,14; H, 5.53; S, 17.60. Found (percent): C, 46.17; H, 5.86; N, 17.28.

Part C–2: Methyl 6-O-(p-tolylsulfonyl)-1-thio-α-D-galactopyranoside 2,3,4-tri-O-acetate (IX)

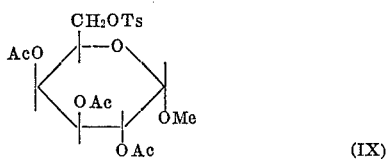

Acylation of 4.54 g. of methyl 6-p-toluenesulfonyl-1-thio-α-D-galactoside (VIII) with 13 ml. of pyridine and 13 ml. of acetic anhydride at room temperature for 17 hrs. yielded 4.9 g. of glassy methyl 6-O-(p-tolylsulfonyl)-1-thio-α-D-galactopyranoside 2,3,4-trio-O-acetate (IX).

*Analysis.*—Calc'd. for $C_{20}H_{26}O_{10}S_2$: Mol. wt. 490. Found: M+, 490.

Part D–2: Methyl 6-deoxy-6-iodo-1-thio-α-D-galactopyranoside 2,3,4-tri-O-acetate (X)

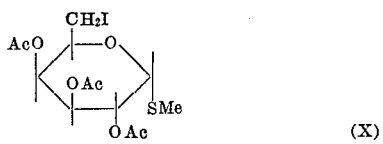

A solution of 19.5 g. of crystalline methyl 6-O-(p-tolylsulfonyl)-1-thio-α-D-galactopyranoside 2,3,4-tri-O-acetate (IX) and 15 g. of NaI in 200 ml. of acetone was heated in a glass bomb at 100° for 7.5 hrs. After cooling the sodium tosylate, which weighed 6.3 g. (82%), was removed by filtration. The acetone was distilled under vacuum. The residue was partitioned between methylene chloum. The residue was partitioned between methylene chloride and dilute sodium bisulfite solution and chromatographed over 1.1 kilograms of silica gel using chloroform-methanol (6:1) as the solvent system. After a forerun of 2.1 liters, 50 ml. fractions were collected. Fractions 2 through 12 were pooled and evaporated to dryness yielding 9.29 g. of methyl 6-deoxy-6-iodo-1-thio-α-D-galatopyranoside 2,3,4-tri-O-acetate (X) (51.2%) as an amorphous solid.

Part E–2: Methyl 6-deoxy-6-nitro-1-thio-α-D-galactopyranoside 2,3,4-tri-O-acetate (XIa)

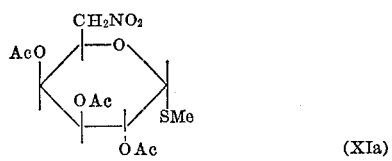

A solution of 9.29 g. of methyl 6-deoxy-6-iodo-1-thio-α-D-galactopyranoside 2,3,4-tri-O-acetate (X), 4.6 g. of NaNO$_2$, and 4.6 g. of phloroglucinol in 300 ml. of dimethylformamide was warmed at 65° C. (bath tem.) for 18 hrs. The solvent was evaporated. The residue was partitioned between methylene chloride and water. The organic phase was percolated through 1.1 kg. of silica gel using cyclohexane-acetone (2:1) for elution. After a forerun of 2.3 l., 50 ml. fractions were collected. Fractions 16 through 24 were pooled and evaporated to dryness yielding 1.13 g. (14.8%) of crystalline methyl 6-deoxy-6-nitro-1-thio-α-D-galactopyranoside 2,3,4-tri-O-acetate (XIa) which when recrystallized from ethyl acetate-technical hexane melted at 165–172° C.

*Analysis.*—Calc'd. for $C_{13}H_{19}NO_9S$ (percent): C, 42.73; H, 5.24; N, 3.83; Mol. wt., 365. Found (percent): C, 42.67; H, 5.24; N, 3.74; M+, 365.

Part F–2: Methyl 6-deoxy-6-nitro-1-thio-α-D-galactoside (XIb) and methyl 6-deamino-6-nitro-α-thiolincosaminide and its 7-epimer (XII).—Method A

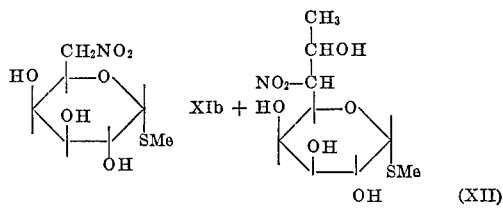

Methyl 6-deoxy-6-nitro-1-thio-α-D-galactopyranoside 2,3,4-tri-O-acetate (XIa) (2.19 g.) was suspended in 90 ml. of methanol and under N$_2$ 0.7 ml. of 25% solution of sodium methoxide in methanol was added over about 5 min. Solution was complete and the mixture tested basic to indicator paper. Tlc (chloroform-methanol, 6:1) showed hydrolysis to methyl 6-deoxy-6-nitro-1-thio-α-D-galactopyranoside (XIb). Acetaldehyde (1 ml.) and 0.2 ml. additional sodium methoxide solution was added, followed in 10 minutes by 1 ml. more acetaldehyde and 3 drops more of sodium methoxide solution. The methanol solution was treated successively with 10 g. of Dowex-50 resin (a crosslinked polystyrene nuclear sulfonic acid cation exchanger). The methanol was evaporated and the residue chromatographed over 1.1 kg. of silica gel using chloroform-methanol (6:1) as the solvent system. After a forerun of 500 ml., 10 ml. fractions were collected. Fractions 25 through 39 were pooled and evaporated to dryness yielding 470 mg. (32.9%) of crystalline methyl 6-deoxy-6-nitro-1-thio-α-D-galactopyranoside (XIb), M+, 239. Fractions 49 through 78 were pooled and evaporated to dryness yielding 547 mg. (32.2%) of crystalline methyl 6-deamino-6-nitro-α-thiolincosaminide (XII), M+, 283.

Method B.—In the manner described in method A, the 470 mg. of methyl 6-deoxy-6-nitro-1-thio-α-D-galactoside (XIb) was condensed with acetaldehyde in methanol in the presence of NaOMe. After chromatography 280 mg. of crystalline methyl 6-deamino-6-nitro-α-thiolincosaminide (XII) (50.3%) was obtained.

Part G–2: Reduction of methyl 6-deoxy-6-nitro-1-thio-α-lincosaminide (XII).

(A) Methyl α-thiolincosaminide and its 7-epimer (XIII)

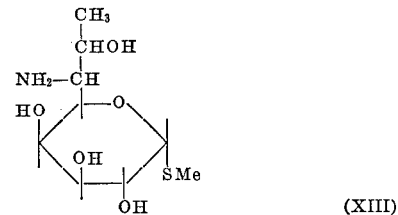

Crude methyl 6-deamino-6-nitro-α-thiolincosaminide (XII) (220 mg.) was dissolved in 3 ml. of tetrahydrofuran and added to 200 mg. of lithium aluminum hydride in 5 ml. of tetrahydrofuran. The reaction mixture was stirred for 0.5 hr. at 20° C. and heated at reflux for 0.75 hr. with cooling a few drops of water were added and the mixture filtered. Evaporation of the filtrate gave only 9 mg. of an oil. The filtration residue was washed well with water and lyophilized. It was then chromatographed over 20 g. of silica gel using methanol as the solvent. After a forerun of 40 ml., 2 ml. fractions were collected. Fractions 2 through 13 were pooled and evaporated to dryness yielding 14 mg. of material containing methyl α-thiolincosaminide and its 7-epimer (XIII).

Part H–2: Lincomycin (XIV)

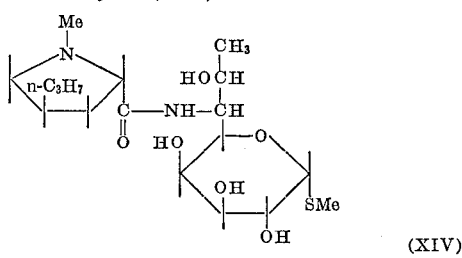

(XIV)

To a solution of 63 mg. (0.3 mmole) of 1-methyl-4-propyl-L-2-pyrrolidinecarboxylic acid hydrochloride, 84 mg. of triethyl amine in 6 ml. acetonitrile was added 42 mg. of 1-butylchloroformate with cooling in an ice-methanol bath. To this solution there was added a solution of 58 g. of crude methyl 1-thio-α-lincosaminide (XIII) prepared according to Part G–2 in 3 ml. of water. After stirring for 1 hr. the reaction mixture was evaporated to dryness in vacuo and the residue taken up in methylene chloride. The methylene chloride extract after filtering over anhydrous sodium sulfate was evaporated to dryness yielding about 100 mg. of crude lincomycin. The crude lincomycin was chromatographed over 15 g. of silica gel using chloroform-methanol 4:1 as the solvent system. After a 40 ml. forerun, 1 ml. fractions were combined. Fractions 2, 3, and 4 were pooled and evaporated to dryness yielding a product containing both lincomycin and its 7-epimer. Fractions 5 through 19 were pooled and evaporated to dryness yielding 6 mg. crude lincomycin as an oil. This was converted to hydrochloride and crystallized from aqueous acetone to yield crystalline lincomycin hydrochloride.

Example 3.—Alternative process

Part A–3: Methyl 1-thio-α-D-galactopyranoside (XVI) from methyl α-thiolincosaminide (XV) via methyl 1-thio-α-D-galacto-hexodialdo-1,5-pyranoside (I).

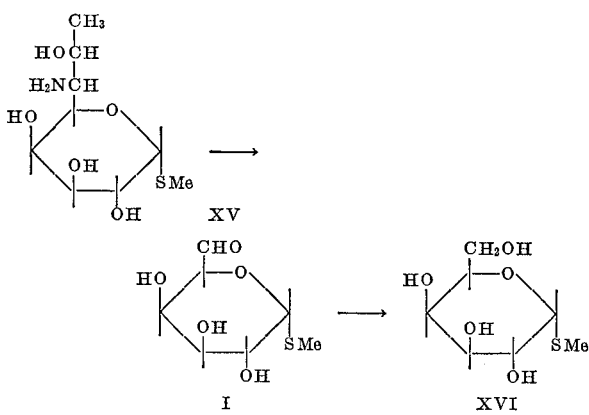

To a cooled solution of 50 g. of methyl α-thiolincosaminide (XV) in 1 l. of H$_2$O was added 41.9 g. of NaIO$_4$. After the initial mild exothermic reaction the cooling bath was removed. The reaction mixture was stirred at ambient temperature for 15 min. The methyl 1-thio-α-D-galacto-hexodialdo-1,5-pyranoside (I) thus formed was not isolated but reduced as follows: While cooling in an ice bath 12.5 g. of NaBH$_4$ was added over a period of about 10 min. keeping the temperature below 35° C. The mixture was stirred an additional 2.5 hrs. Conc. HCl was cautiously added until the pH of the solution was 7. This solution was passed over a column of 1.1 kg. of mixed bed ion exchange resin (MB–3) followed by 1.8 l. of water. The combined effluent was lyophilized and dried under vacuum over P$_2$O$_5$ to yield 22.3 g. of methyl 1-thio-α-D-galactopyranoside (XVI) (53.3%). This material was not further purified but tosylated as described below.

Part B–3: Methyl 6-O-(p-tolylsulfonyl)-1-thio-α-D-galactopyranoside (VIII)

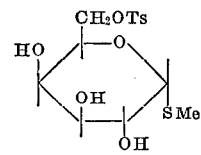

(VIII)

The 22.1 g. of methyl 6-O-(p-tolylsulfonyl)-1-thio-α-D-galactopyranoside (XV) of part A–3 was dissolved in 110 ml. of pyridine. The solution was cooled in an ice bath while 20 g. of tosyl chloride was added. The reaction mixture was maintained at 2° C. overnight. The pyridine was evaporated in vacuo and the residue shaken with 40 ml. of cold 6 N HCl. The crystals were collected by filtration, washed and dried. The yield of methyl 6-O-(p-tolylsulfonyl) - 1 - thio-α-D-galactopyranoside (VIII), M.P. 137–140° C. dec. (sinter 130° C.) was 18.2 g. (47.7%). This material was identical of that prepared by Example 2, part A–2.

I claim:

1. A compound of the formula

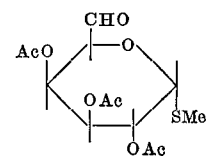

where Me is lower alkyl and Ac is hydrogen, lower-alkanoyl or benzoyl.

2. A compound according to claim 1 in which Ac is acetyl or benzoyl.

3. A compound according to claim 1 in which Ac is hydrogen.

4. A compound according to claim 1 in which Ac is hydrogen and Me is methyl.

5. A process for making a compound of the formula

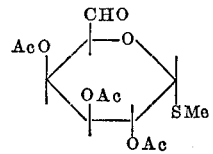

wherein Me is lower alkyl and Ac is hydrogen or a protective carboxacyl removable by acid or base catalyzed hydrolysis which comprises subjecting to periodate oxidation in an aqueous medium with cooling to keep the temperature between zero to 25° C., and with not more than a five percent excess of periodate and a periodate concentration of between about 0.1 and 0.5 mole per liter, a compound of the formula

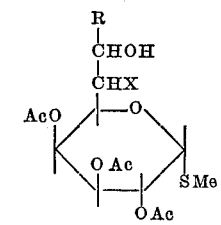

where R is methyl or hydrogen, X is OH or NH$_2$, and Me and Ac are as given above.

6. A process according to claim 5 in which Ac is hydrogen.

7. A process according to claim 5 in which Ac is lower-alkanoyl or benzoyl.

8. A process according to claim 5 in which Ac is acetyl or benzoyl.

References Cited

UNITED STATES PATENTS

| | | | |
|---|---|---|---|
| 3,205,125 | 9/1965 | Opie et al. | 260—209 R |
| 3,239,500 | 3/1966 | Keen et al. | 260—209 R |
| 3,297,604 | 1/1967 | Germino | 260—209 R |
| 3,382,230 | 5/1968 | Magerlein | 260—210 R |

LEWIS GOTTS, Primary Examiner

J. R. BROWN, Assistant Examiner